United States Patent
Jackson et al.

(10) Patent No.: US 8,650,061 B2
(45) Date of Patent: Feb. 11, 2014

(54) COMPLIANCE MANAGEMENT SYSTEM AND METHOD

(75) Inventors: Brian L. Jackson, Mansfield, TX (US); Craig E. Bingham, Arlington, TX (US)

(73) Assignee: Atmos Energy Corporation, Dallas, TX (US)

( * ) Notice: Subject to any disclaimer, the term of this patent is extended or adjusted under 35 U.S.C. 154(b) by 595 days.

(21) Appl. No.: 12/708,255

(22) Filed: Feb. 18, 2010

(65) Prior Publication Data

US 2010/0145758 A1    Jun. 10, 2010

Related U.S. Application Data

(63) Continuation of application No. 10/033,943, filed on Dec. 28, 2001, now Pat. No. 7,676,389.

(51) Int. Cl.
*G06Q 10/00*    (2012.01)
(52) U.S. Cl.
USPC ............................................. 705/7.24
(58) Field of Classification Search
USPC ..................................... 705/7, 7.24
See application file for complete search history.

(56) References Cited

U.S. PATENT DOCUMENTS

| | | |
|---|---|---|
| 4,864,492 A | 9/1989 | Blakely-Fogel et al. |
| 4,887,204 A | 12/1989 | Johnson et al. |
| 4,896,291 A | 1/1990 | Gest et al. |
| 5,726,884 A | 3/1998 | Sturgeon et al. |
| 5,920,846 A * | 7/1999 | Storch et al. .................. 705/7 |
| 6,581,040 B1 * | 6/2003 | Wright et al. .................. 705/8 |
| 6,912,502 B1 * | 6/2005 | Buddle et al. .............. 705/7.41 |
| 6,978,210 B1 | 12/2005 | Suter et al. |
| 7,058,508 B2 * | 6/2006 | Combs et al. ............... 701/213 |

OTHER PUBLICATIONS

Geringer et al (Department of Environmental Quality), Nov. 2000, pp. 1-264.*
Smith et (A Simplified Lumped Parameter Model for Finding Distribution Transformer and Secondary System Responses to Lighting), Jul. 1989, IEEE of Transactions on Power Delivery, vol. 4. vol. 3, pp. 1927-1935.*
DSM Best Practices "Canadian natural gas distribution utilities's best practices in demand side management", Dec. 2005, pp. 1-68.*
Dialog "Santa Fe Pacific Corp", Dialog File 541, Accession No. 0578577, pp. 1-2, Dec. 31, 1991.

* cited by examiner

*Primary Examiner* — Romain Jeanty
(74) *Attorney, Agent, or Firm* — Hunton & Williams LLP (57) ABSTRACT

A computerized method for natural gas distribution compliance management is provided. The method includes maintaining a database identifying a plurality of compliance events and a plurality of resources. A computer system is provided including a main computer and a remote computer adapted to communicate with the main computer. The main computer retains at least a portion of a main program and the database. The remote computer retains a remote program operative to display and modify a remote portion of the compliance events and a remote portion of the resources of the database. The database is periodically scanned to identify at least one of the compliance events requiring a response and to identify at least one of the resources to respond to the compliance event requiring the response. Compliance events are matched and scheduled with the resource to respond to the compliance event.

20 Claims, 3 Drawing Sheets

COMPLIANCE MANAGEMENT SYSTEM AND METHOD

CROSS-REFERENCE TO RELATED APPLICATIONS

This continuation application claims the benefit of U.S. application Ser. No. 10/033,943 filed Dec. 28, 2001 now U.S. Pat. No. 7,676,389, the disclosure of which is expressly incorporated herein by reference in its entirety.

TECHNICAL FIELD OF THE INVENTION

The present invention is directed to a compliance management system and more particularly, but not by way of limitation, to a compliance management system and method for managing natural gas distribution systems.

BACKGROUND OF THE INVENTION

In the field of public utilities, and more specifically in the field of natural gas delivery, distribution systems require considerable repair and monitoring to preserve and maintain distribution assets. Additionally, publicly regulated natural gas distribution and delivery systems must comply with regulatory requirements in many aspects of natural gas distribution operations.

For example, when a leak is detected in a publicly regulated gas distribution system, regulations may require that the leak be repaired within a predetermined time-period. Furthermore, the repair procedure must be accomplished according to guidelines set by the regulating authority. Such repair procedures may include follow-up monitoring of the leak over a fixed time interval to verify that the repair has been successful.

Regulatory agencies also require that gas distribution operators provide documentation establishing that these repair procedures conform to the regulatory guidelines. Supporting documentation that the proper procedures were followed is generally provided during routine audits or may be requested by the regulatory authority on-demand and without advanced notice. For this reason, compliance with the myriad of regulatory requirements for natural gas distribution operation is a difficult and time-consuming task.

Commonly, distribution system management has been accomplished using standardized paper forms promulgated by the regulatory authority. Paper systems, however, are inefficient since they are difficult to store, retrieve and require considerable time to aggregate for regulatory reporting purposes. Previous attempts to streamline the compliance process have included computerization of natural gas distribution line leaks, surveys and monitors.

For example, under these prior systems when a leak was detected or reported in a gas distribution line, a computer entry was made to schedule a leak repair within the time period required by the regulating authority. A report detailing the required repair criteria was then timely generated by the computer system and furnished to a technician who would make the repair.

Based on a computer entry documenting the completion of the repair, the computer system would automatically schedule, according to regulatory requirements, follow-up monitoring to verify that the repair was, in fact, successful at stopping the leak. The computer system was also utilized to schedule natural gas distribution line surveys, again according to regulatory requirements. Survey reports were timely generated by the computer system and furnished to the technician who would physically inspect the pipeline for irregularities or leaks. The data compiled by these prior systems could subsequently be aggregated for reporting to the appropriate regulatory authority.

A need continues to exist for an improved compliance management system and method for accurately and efficiently managing compliance of a natural gas distribution system. It is to such an improved compliance management system and method that the present invention is directed.

SUMMARY OF THE INVENTION

In one aspect, the present invention is directed to a computerized method for natural gas distribution compliance management. The method includes maintaining a database identifying a plurality of compliance events and a plurality of resources. The method further includes providing a computer system including a main computer and a remote computer adapted to communicate with the main computer. The main computer retaining at least a portion of a main program and the database. The remote computer retaining a remote program operative to display and modify only a remote portion of the plurality of compliance events and only a remote portion of the plurality of resources of the database.

The method includes periodically scanning the database to identify at least one of the plurality of compliance events requiring a response. The method includes scanning the database to identify at least one of the plurality of resources to respond to the compliance event requiring the response. The method further provides for matching at least one of the plurality of resources with the compliance event requiring the response and scheduling the resource to respond to the compliance event.

In yet another aspect, the present invention provides computerized method of managing a compliance event for a natural gas distribution system. The compliance event including at least one of a cathotic protection event, a danger tags event, a poly-pipe event, an odorant injection event, and a service line scheduling event. The method providing a computer system including at least a main computer and a remote computer adapted to communicate with the main computer.

The method further includes maintaining a database including the compliance events and a plurality of resources, at least a portion of the database resident on the main computer. The method includes periodically scanning the database to identify compliance event requiring a response and scanning the database to identify one of the plurality of resources to respond to the compliance event requiring the response.

The method includes scheduling one of the plurality of resources to respond to the compliance event requiring the response. The method provides for downloading to the remote computer the schedule of one of the plurality of resources to respond to the compliance event and uploading from the remote computer to the main computer a completion information associated with the resource responding to the compliance event.

In one aspect, the present invention provides a compliance management system for managing compliance of a natural gas distribution system. The compliance management system includes a main computer and a remote computer adapted to communicate with the main computer. The compliance management system further includes a database, a main program and a remote program.

The database, at least a portion of which is retained by the main computer, including a plurality of compliance events, a plurality of resources, and a plurality of units, each of the plurality of compliance event and the resources associated with at least one of the plurality of units. The main program on at least the main computer for maintaining the database. The main program including a scheduling program for scheduling one of the plurality of resources to perform one of the plurality of compliance events by selecting the resource having the unit substantially similar to the unit associated with the compliance event to be performed.

The remote program disposed on the remote computer and accessible by at least one of the plurality of resources for receiving from the main computer at least a portion of the compliance event to be performed by the resource. The remote program having an interface operative to display and periodically update the portion of the compliance event to be performed by the resource such that when the main program is modified to operatively maintain the plurality of compliance events and the plurality of resources, only the interface of the remote program is modified for the interface to operatively display and update the compliance event to be performed by the resource.

In yet another aspect, the present invention provides a computer readable medium having executable instructions for performing a method for compliance management. The method includes maintaining a database identifying at least one compliance event and a resource and scanning the database on a periodic basis to determine the compliance event to be performed.

The method includes associating the compliance event with the resource to perform the compliance event based upon a unit associated with both the compliance event and the resource. The method provides for scheduling the resource to perform the compliance event. A completion information of the compliance event is entered based upon completion of the compliance event by the resource and a report is generated including at least one compliance event and a portion of the completion information of the compliance event.

One advantage of the present invention is that the compliance management system provides for efficiently managing every aspect of compliance management related to cathotic protection, danger tags, poly-pipe, odorant injection, and service line scheduling. Another advantage is that the present invention provides for easily scheduling these compliance management events, determining and allocating the available resources to perform the compliance event and documenting the compliance process for future reporting purposes.

Yet another advantage of the present invention, by associating the compliance management event with the resource, an available and local resource may be readily determined an allocated to perform the compliance event. Yet another advantage is that the compliance information may be readily and easily aggregated for reporting of numerous aspects of the compliance events for satisfying regulatory reporting requirements.

Other objects, features, and advantages of the present invention will be apparent to those skilled in the art from the following detailed description when read in conjunction with the accompanying drawings and appended claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

It should be understood at the outset that although an exemplary implementation of the present invention is illustrated below, the present invention may be implemented using any number of techniques, whether currently known or in existence. The present invention should in no way be limited to the exemplary implementations, drawings, and techniques illustrated below, including the exemplary design and implementation illustrated and described herein.

Figure 1:
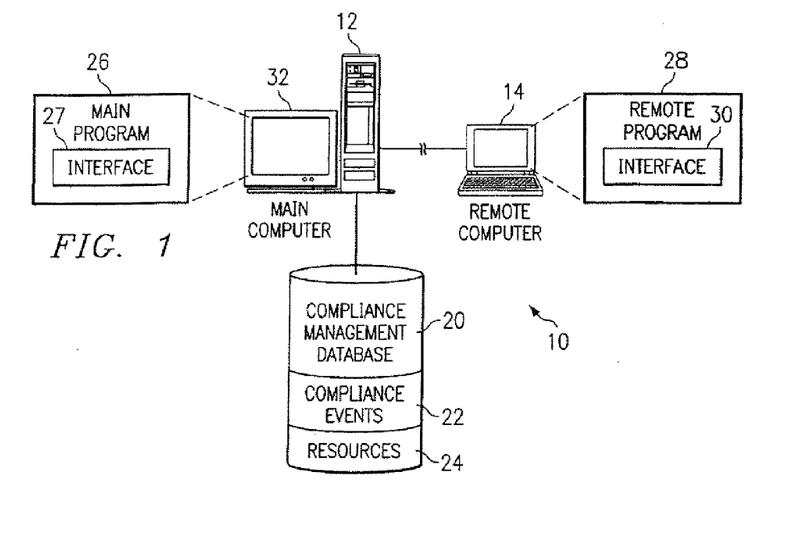
FIG. 1 is a diagrammatic illustration of one aspect of a compliance management system of the present invention.

FIG. 1 illustrates a compliance management system 10 which is a useful computer application for managing compliance with regulatory and other requirements in the operation of natural gas distribution systems. Natural gas distribution systems whether they be interstate, intrastate, or local and municipal distribution systems for providing natural gas to end-user consumers, require considerable regulatory and administrative compliance to comply with the myriad of state, federal, and local regulations, as well as, the administrative and maintenance tasks confronted with administering and maintaining such gas systems. Although the present invention has specific application in the field of natural gas distribution, the compliance management system 10 has many useful features and functions that have application in many other areas.

The compliance management system 10 includes a computer system that may include a main computer 12 and a remote computer 14. The main computer may be a standard network server or personal computer or may be a system disposed in an environment such as the internet, the world wide web, or a computer network environment for storing, processing and retrieving data from a variety of well-known devices. The remote computer may be a laptop computer, PC or workstation computer, personal digital assistant ("PDA"), a pager, wireless or portable telephone system adapted to communicate with the main computer 12. The remote computer 14 may communicate with the main computer 12 in a variety of manners including a standard telephone connection or other network connection such as via the internet, wirelessly, or via infrared communication system utilized for communicating, uploading and downloading information between the main computer 12 and the remote computer 14.

A compliance management database 20 may be stored on a storage device (not shown) on the main computer 12 or may be stored at a remote location that is accessible by the main computer 12 such as magnetic drive, optical drive, for example, which may be utilized for mass data storage. The compliance management database 20 includes a plurality of compliance events 22 and a plurality of resources 24.

The compliance management system 10 further includes a main program 26, the main program 26 and the compliance management database 20 accessible by the main computer 12. The main program of the compliance management system 10 is capable of performing a variety of database management functions such as adding, modifying, deleting and managing the compliance management database 20. The main program is also adapted for sorting and reporting on the compliance management database 20. The main program 20 may be a standard computer program developed using well-known computer languages, such as Java, C, or other computer application development environments utilized for accessing and managing computer data such as the compliance management database 20.

In one aspect, the main program 12 may be a server application in a client server environment. The client server environment, however, may not be advantageous in certain aspects and the main program 26 may utilize transaction server features, such as those available by the Microsoft transaction server when employing Microsoft SQL2000 where the compliance management database 20 is a SQL ("structured query language") database. This environment for the compliance management system 10 may be advantageous in certain aspects which will be discussed in greater detail hereinafter.

The main program 26 includes in interface 27 for displaying information on a display device 32 perceivable by user of the compliance management system 10. In this manner the main program 26 may include a plurality of interfaces 27 for accessing data and developing reports on various aspects of the compliance management system 10, as well as interfaces 27 for modifying, adding, and maintaining the compliance management database 20 for these purposes.

The compliance management system 10 further includes a remote program 28 that is accessible by the remote computer 14. The remote program 28 including an interface 30, the remote program 28 and interface 30 will be discussed in greater detail hereinafter.

Figure 2:
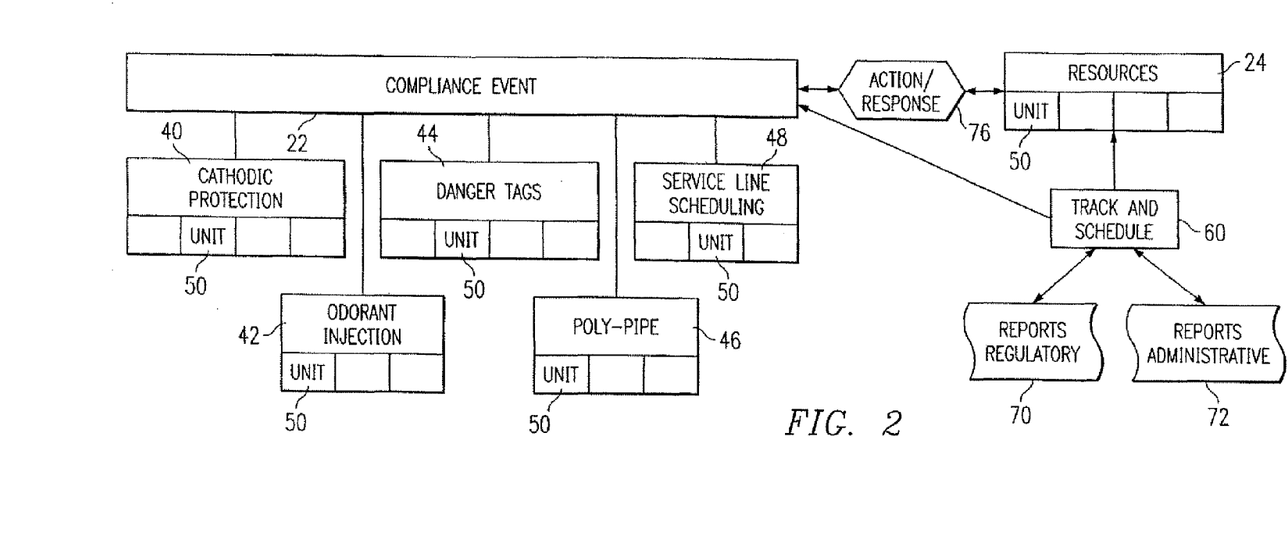
FIG. 2 is a diagrammatic view of the compliance management system according to another aspect of the present invention illustrating a plurality of compliance events.

FIG. 2 is a diagrammatic illustration of one aspect of the compliance management system 10 detailing the compliance events 22 of the compliance management database 20. The compliance events 22 may be a computer file or individual databases or database records for managing regulatory and administrative procedures necessary for the maintenance of natural gas distribution systems. Examples of the compliance events 22 include a cathotic protection 40, an odorant injection 42, a danger tags 44 and polypipe 46 and a service line scheduling 48.

The cathotic protection 40 includes information related to cathotic protection which generally relates to protecting natural gas pipes. An anode is placed on the pipe riser that feeds gas to the inlet side of the meter. A certain percentage of these pipe risers must be tested every year to ensure that the anode is working properly.

The cathotic protection 40 may include information related to the location or unit 50, such as a geographical area, physical map location, or allocatable business or work group which may be located geographically. The cathotic protection 40 may also include information related to the type of consumer or commercial dwelling, the type or information regarding the pipe delivering the natural gas, and a variety of testing and scheduling information related to monitoring and reporting on cathotic protection generally.

The odorant injection 42 relates to injecting odorant having a smell perceivable by individuals into the natural gas being distributed by the natural gas distribution system. Odorant is frequently injected so that leaks are more readily detected by customers and consumers, as well as by technicians in the field. For regulatory and administrative reasons information regarding odorant injection 42 is maintained. Such odorant injection information 42 may include the type of odorant injected into the natural gas distribution system, the location and quantity of the injection, the dates and individuals associated with the injection, as well as unit 50 related to the location, geographic or otherwise associated with the odorant injection 42.

The danger tags 44 relates to placement by technicians of warning labels or tags on an appliance or equipment that utilizes natural gas whenever such appliance or equipment is observed to have an unsafe condition. Frequently, technicians of natural gas distribution systems are called to inspect a system when a leak has been detected by a consumer, customer or others When such unsafe equipment is observed, the technician may be required by regulatory or administrative procedures to terminate or shut-off the gas being supplied to the unsafe equipment. Furthermore, the technician may be required to place a warning or danger tag on the appliance to identify that the appliance or equipment should be repaired prior to reactivating the gas supply. Regulatory and administrative procedures may require record keeping of such events. A leak is one example of an unsafe condition.

The danger tags 44 information provides and efficient means of managing this type of information. The danger tags 44 information may include the type of appliance or equipment that was the cause of the leak, the location, such as the unit 50, of the leak from a geographical perspective, as well as information identifying the technician, the date, and any other relevant information associated with such leaks.

The polypipe 46 is useful for monitoring and managing certain types of gas distribution equipment, such as pipe constructed of polymeric or other types of materials used to manufacture pipes capable of distributing natural gas. Although steel or metal pipes may be used in gas distribution systems, a considerable amount of plastic or polymeric pipe is used to distribute natural gas, particularly on the tributary lines connecting to the consumer or customer.

Certain types of pipe, such as certain polymeric based pipes, may have a predetermined useful life that require repair, replacement or monitoring depending on the ability of such material to resist corrosion, corruption or the probability or likelihood that the pipe may be more susceptible to leaking natural gas. The polypipe 46 may include information such as the type of pipe that will be monitored, the frequency with which such monitors should be accomplished, the percentage of pipe that should be monitored and/or replaced, the dates, locations, such as the unit 50 indicating the physical location or geographical area, as well as the technician or individuals associated with monitoring and repairing or replacing the pipe. In addition, information related to percentages of the total amount of such pipe that is within the distribution system and the percentage of such pipe that must be monitored, repaired, or replaced on a periodic basis may also be maintained in this manner.

The service line scheduling 48 may include information regarding servicing, repairing, replacing, upgrading, and new construction of the natural gas distribution system. For example, when any such service, maintenance or expansion is necessary on the natural gas distribution system, the service line scheduling 48 information may be utilized to include information on the location, such as the unit 50, for such service, the type of service to be accomplished, the time by which such service must be made, the qualifications and capabilities of the technicians or contractors, and a variety of other information related to such activity.

The compliance event 22 information of the compliance management database 20 provides the above-mentioned data management capabilities, however, it should be appreciated that a variety of additional regulatory and administrative compliance procedures and events may also be included in the compliance management system 10 and are within the spirit and scope of the present invention and will readily suggest themselves to one of ordinary skill in the art in view of the disclosure of the present invention. It will be appreciated that utilization of the compliance management system 10 of the present invention allows operators of natural gas distribution systems, for example, to manage and comply with the regulatory requirements with respect to a variety of compliance events 22, such as those previously discussed above.

Furthermore, although certain aspects of the variety of compliance events 22, such as but not limited to the cathotic protection 40, have been discussed with respect to the specific compliance event 22, as well as the information that may be maintained and related to such compliance event 22, it will be appreciated that any information related to the specific compliance event 22 may be maintained by the compliance management system 10 of the present invention.

Figure 3:
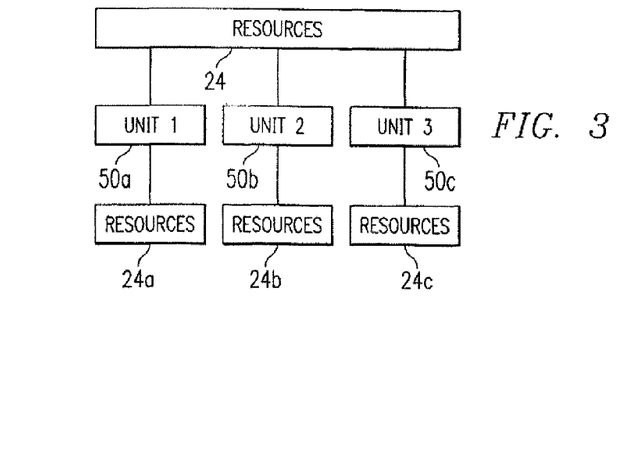
FIG. 3 is a diagrammatic view of the compliance management system according to another aspect of the present invention illustrating a plurality of resources.

Referring also to FIG. 3, the plurality of resources 24 of the compliance management database 20 are shown. The resources 24 include, but are not limited to, employees, individuals, technicians, contractors and outside companies, equipment, supplies, and assets of the natural gas distribution system available for performing the compliance events 22. For example, as previously discussed, for regulatory or administrative purposes, it may be necessary to schedule technicians to monitor or test the anodes on the pipe risers of, for example, one percent (1%) of all such risers within a natural gas distribution system.

The cathotic protection 40 portion of the compliance management database 20 may be utilized to generate a number of cathotic protection 40 records or database entries in the compliance management database 10. The compliance management system 10 includes a module 60 to track and schedule such compliance events 22. In this manner the compliance management system 10, utilizing the module 60, is capable of tracking the compliance events 22, such as the cathotic protection 40, and scanning the resources 24 to schedule the compliance event 22. The module 60 may include a number of sub-programs or routines to access or manipulate the compliance management database 20. These programs may be accessible from menus, pull-down or otherwise, and utilizing well known graphical user interfaces (GUI).

A variety of querying and associating techniques, such as using key fields within the compliance management database 10 associated with one another including primary, secondary, or other key fields may be utilized for associating the proper resources 24 with the appropriate compliance event 22. The module 60 is adapted to identify the unit 50 wherein the cathotic protection 40 is required and identify an adequate resource from the resources 24 based on the unit 50 of the resource 24.

For example, in a large gas distribution operation, the system may be managed and operated in geographical regions, such as a first unit 50a a second unit 50b and a third unit 50c. Each of the units, 50a, 50b and 50c representing a different geographical region wherein each of the geographical regions have different resources 24a, 24b and 24c, respectively, available to each of units 50a, 50 b and 50c.

In one aspect of the present invention, the compliance management system 10 may include computer systems available at various geographical locations such that a manager of a geographic area, or unit 50, may access the compliance management system 10 and determine the required compliance events 22 to be performed in that particular unit 50. The manager may then identify and schedule, utilizing the module 60, resources 24 representative of technicians or contractors to accomplish the particular compliance event 22, such as the cathotic protection 40.

Once the manager, for example, uses the compliance management system 10 to schedule the resource 24 to accomplish the compliance event 22, the module 60 then continues to track the scheduled compliance event 22. The manager or other user of the compliance management system 10 may from time to time view, utilizing the interface 27 of the main program 26, all compliance events 22 and the current schedule of the resources 24 allocated to perform the compliance event 22. The allocation or association of resources 24 with compliance events 22 may be accomplished via "drag and drop" or other GUI interface options for creating schedules and associating data records which are well known in the art.

The interface 27 may provide a variety of displayed or hardcopy reports of various aspects of the compliance event 22 information and the allocated resources 24. This is a significant advantage of the present invention in that on a unit 50 basis, a variety of compliance events 22 and may be managed and the resources 24 available and allocatable to perform the specific events may be readily identified and managed either from a central system or on a unit 50 basis at various locations throughout the compliance management system 10. Another advantage is that managers at one unit, such as the unit 50b, may be aware of the available resources 24b within that unit 50b; however, the manager may be unaware of the resources available at other units 50 such as the resources 24a and 24c available in other units 50, such as 50a and 50c, respectively.

With respect to the odorant injection 42, the module 60 is operable to schedule one of the plurality of resources 24 to perform the injection of the odorant based on the information maintained by the odorant injection 42 portion of the compliance management database 20. Again, the association of the odorant injection 42 with the applicable resource 24 may be based on, for example, the unit 50 associated with both the resource 24 and the odorant injection 42.

It will be appreciated, however, that while the compliance events 22 and the resources 24 have an associated unit 50 for scheduling and tracking purposes by the module 60, in another aspect of the present invention the association of the compliance event 22 and the resource 24 may be based upon any number of other factors including the capabilities of the resource, the type of compliance event 22 or other association factors.

Scheduling and tracking the danger tags 44 is managed either once the leak has been reported or after the resource 24 responds and places the warning tag. The danger tag 44 information is recorded in the compliance management database 20 for future retrieval and reporting purposes. This is another advantage of the present invention since reporting becomes a matter of selecting to generate reports associated with a particular compliance event 22, such as danger tags 44.

A variety of regulatory reports 70 are also included in the compliance management system 10 as well as a variety of administrative reports 72. The danger tags 44 is an example of compliance event 22 information that is reported on utilizing the regulatory reports 70 included in the present invention. For example, when it is required that a report be produced detailing the total number, location, and circumstances surrounding the placement of such warning tags. The regulatory reports 70 are generated from the danger tags 44 information of the compliance management database 20. This useful feature of the present invention allows the operator of the natural gas distribution system to simply and easily generate a report detailing all the information necessary for regulatory compliance with respect to such compliance units 22. Furthermore it may be useful from time to time to produce administrative reports 72 similar to those regulatory reports but useful for management, operations, and efficiency purposes.

The module 60 may also be useful for tracking and scheduling information such as the polypipe 45 information for periodically scheduling, as required by regulatory and administrative practices, inspection, maintenance, replacement and service of pipe, as previously discussed above, as may, from time to time need to be monitored and repaired or replaced. Finally, the module 60 is useful for tracking and scheduling service line scheduling 48 information such as previously discussed for scheduling service and construction of the natural gas distribution system.

It will be appreciated that the regulatory reports 70 and administrative reports 72 may be utilized for the cathotic protection 40, the odorant injection 42, the danger tags 44, the polypipe 46 and the service line scheduling 48 equally well. The specific details of each report is a matter of preference and efficiency and may be readily achieved using well-known software development tools and techniques.

In addition, the compliance management system 10 further includes and action/response module 76 which is operative to identify actions necessary to satisfy compliance events 22 as well as generating responses that are periodically required by regulatory or administrative practices for managing a natural gas distribution system. For example, as previously discussed, certain events such as the cathotic protection 40 and the polypipe 46 require a predetermined response over a fixed time period. For example, a certain number of risers must be monitored from time to time to ensure that the anode is working properly and, as such, the cathotic protection 40 information is maintained in the compliance management database 20 for these purposes.

The action/response 76 module may be utilized to periodically scan and schedule, by entering a predetermined date in a certain percentage of the fields of the cathotic protection 40 records of the compliance management database 20. These dates may then be monitored by the module 60 to ensure they show a completion date, such as in a completion field, within the desired time. In addition, the action/response 76 may from time to time scan the compliance management database 20 and identify or generate information regarding compliance events 22 including the total number of such compliance events 22 that must be responded to within the predetermined period of time to satisfy regulatory practices.

It will be appreciated that the action/response 76 module is useful for manipulating the compliance management database 20, specifically the compliance events 22 to satisfy regulatory or administrative practices. The compliance management system 10 provides several useful features for managing a natural gas distribution system with respect to the compliance events 22 in that a user may generate the administrative reports 72, to readily determine whether a satisfactory percentage of, for example, the cathotic protection 40 information have been scheduled and complied with or the user may rely on the action/response 76 module to generate a warning or report or message to the user that a response is needed.

Whether the user relies on the administrative report 72, the regulatory report 70 or the action/response 76 module, the action/response 76 is adapted to have a certain number or percentage of the necessary compliance events 22 brought to the user's attention in advance of the required time period for completing such compliance events 22. The action/response 76 is also adapted to provide a countdown or priority whereby each of the compliance events 22 is given a higher or lower priority based upon the time away from or beyond the regulatory or administratively required time period for performing such compliance event 22.

When a report, for example such as a regulatory report 70 of the cathotic protection 40, is viewed by the user the report would indicate the higher priority of the cathotic protection 40 compliances events 22 that require immediate response based on the total percentage completed, the total percentage remaining to be completed to comply for the year, the total percentage by unit 50, and other useful information for maintaining, scheduling and tracking these events to satisfy the necessary regulatory and administrative practices. Thus, the action/response 76 is another advantage of the present invention.

Figure 4:
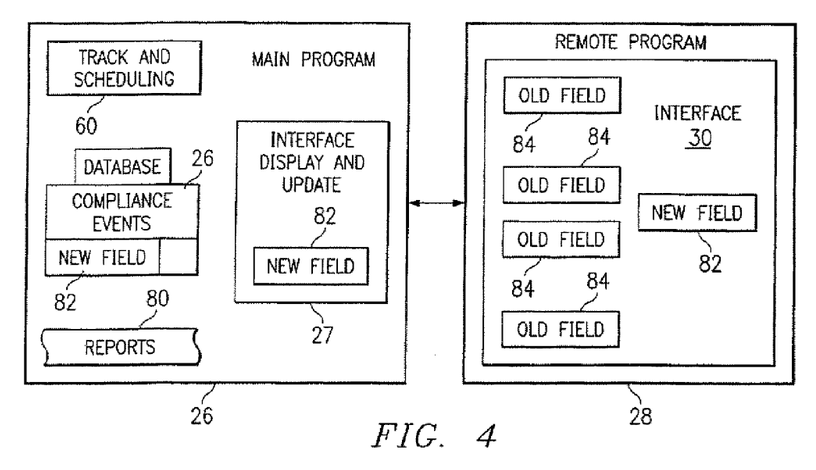
FIG. 4 is a block diagram illustrating one aspect of a main program and a remote program according to one aspect of the present invention.

FIG. 4 illustrates another aspect of the present invention for the compliance management system 10 of the main program 26 and the remote program 28. It will be appreciated that over time additional regulatory requirements for managing a natural gas distribution system will require modification to certain aspects of the compliance management system 10. The compliance management system 10 of the present invention provides a unique and efficient method for updating and modifying the present system to adapt to such changes. In standard operation, the user of the compliance management system 10, such as from the main computer 12 utilizing the main program 26 may access the compliance management database 20 and utilizing the module 60. The user may track and schedule the compliance events 22 as well as generating the necessary reports 80, as previously mentioned such as the regulatory report 70 and the administrative report 72. Furthermore, the main program provides the interface 27 to display, modify, update and manage all aspects of the compliance management database 20.

It may be necessary to add, for example, a new field 82 to the cathotic protection 40 information maintained by the compliance management database 20. Although, in this example, the new field 82 may be viewed as a single field within a record in the compliance management database 20, it will be appreciated that the new field 82 may be a new record or a new file as well as a new database including additional information in addition to the compliance events 22 illustrated with respect to FIG. 2.

The remote program 28 is provided with an interface 30 allowing the user of the remote program to view and update compliance events 22. For example, an employee or technician of the gas distribution system may be provided with the remote computer 14 and on a periodic basis may have information communicated from the main computer 12 to the remote computer 14 representing compliance events 22 that have been assigned to the technician or employee to be performed. As such, the user may connect to the main computer 12, for example wirelessly or on a periodic basis, and upload and download information between the main computer 12 and the remote computer 14. In this manner, the technician may utilize the remote computer 14 when doing work out in the field and away from the office. This allows the technician, contractor, or other to view the compliance events 22 that have been scheduled to be performed by the resource 24 simply and easily.

The interface 30 may, in one aspect, provide the user a list of compliance events 22 that need to be responded to, for example, in a priority order or in a sequential order, or otherwise which will readily suggest themselves to one of ordinary skill in the art. The user of the remote computer 14, after completing the compliance event 22, may then enter certain information, such as completion information that may be included in a field of the compliance management database 20 indicative of the compliance event 22 being completed satisfactory by the resource 24. Such completion information may then be uploaded either wirelessly simultaneously as it is entered in the remote program 28 or upon returning to a docking station or other system in communication with the main computer 12 for communicating the completion information from the remote computer 14 to the main computer 12 for archival and subsequent reporting purposes.

However, the advantage of the remote program 28 of the compliance management system 10 of the present invention is that the remote program 28 provides a data only interface. Thus, only the data information necessary for the user of the remote program 28 to view the compliance event 22 necessary to be performed by the resource 24 is available and accessible to that user. In this manner, it is unnecessary to load a large program on the remote computer 14 that has the features, capabilities, and functionality of the main program 26 and instead is only a "thin client" or "data only" interface to the necessary portion of the compliance management database 20.

Although the main program 26 necessarily dictates the portion of the compliance management database 20 that is directed to the remote program 28 and resulting interface 30, such design provides for a minimal program size of the remote program 28 to operate efficiently. Another advantage of this configuration is that when a new field 82 is provided in the compliance management database 20 or additional features are necessary for the interface 30 on the remote program 28, only certain portions of the remote program 28, such as data elements in a data file, need to be modified on the remote program 28 for the user to be able to utilize the information via the interface 30. In another aspect, it may be useful to update the remote program 28 and interface 30 in its entirety, but since the remote program 28 is a "thin client" or "data only" interface 30, the overall size is such that updating the remote computer 14 with such a remote program may be accomplished efficiently. Specifically, such a minimalistic approach toward the remote program 28 makes updating the remote computer 14 a simple and efficient task.

Although the remote program 28, in some aspects, may be a client application such as in a client server environment, in other aspects it may be advantageous for the remote program to include only an interface 30 for managing only certain data elements of the compliance management database 20 necessary for the remote computer 14 for the purposes of the present invention. Even in a client server application environment, the remote clients are typically very large applications wherein the logic and execution is driven by the client application. The drawback to this approach is that when a modification is necessary, an entirely new client application must be loaded on each of the client computers. When the communication connection to such client computers is via a slow modem or other than a high-speed connection, such an update can take a considerable amount of time and becomes very inefficient.

However, the compliance management database 10 provides the remote program 28 which may utilize a transaction server, such as available from Microsoft for SQL2000. In this manner, the remote program 28 is "data only" interface for displaying information in old fields 84 and may be easily and quickly updated even over a slow modem connection, for example, with information on the new field 82. Once the remote program 28 prepares to upload, for example completion information or download compliance events 22, the remote program 28 communicates with the main program 26 which provides the necessary transaction functionality.

The processing and routines are accomplished by the main program 26 and only the data and minimal instruction information is necessary to be passed to the remote program 28 for use on the remote computer 14. In practice, such a process may be easily accomplished by a computer instructions or calls from the remote program 26 via standard communication connection to the main program 26, which may include as a portion of the main program 26 a transaction server (not shown), with a data request. The call is received by a dynamic link library (DLL) which interprets the request and generates the necessary information through instructions in the DLL on the transaction server. The transaction server calls and accomplishes the necessary querying of the compliance management database 20, which may be an SQL database, and subsequently returns the information to the remote program 28.

Because of the increased portability and updateability of the remote program 28, the compliance management system 10 has numerous advantages which will readily suggest themselves to one of ordinary skill in the art including the ability to simply and easily update numerous remote computers, such as the remote computer 14, whenever a modification is made to the main program 26 or to the compliance management database 20.

Figure 5:
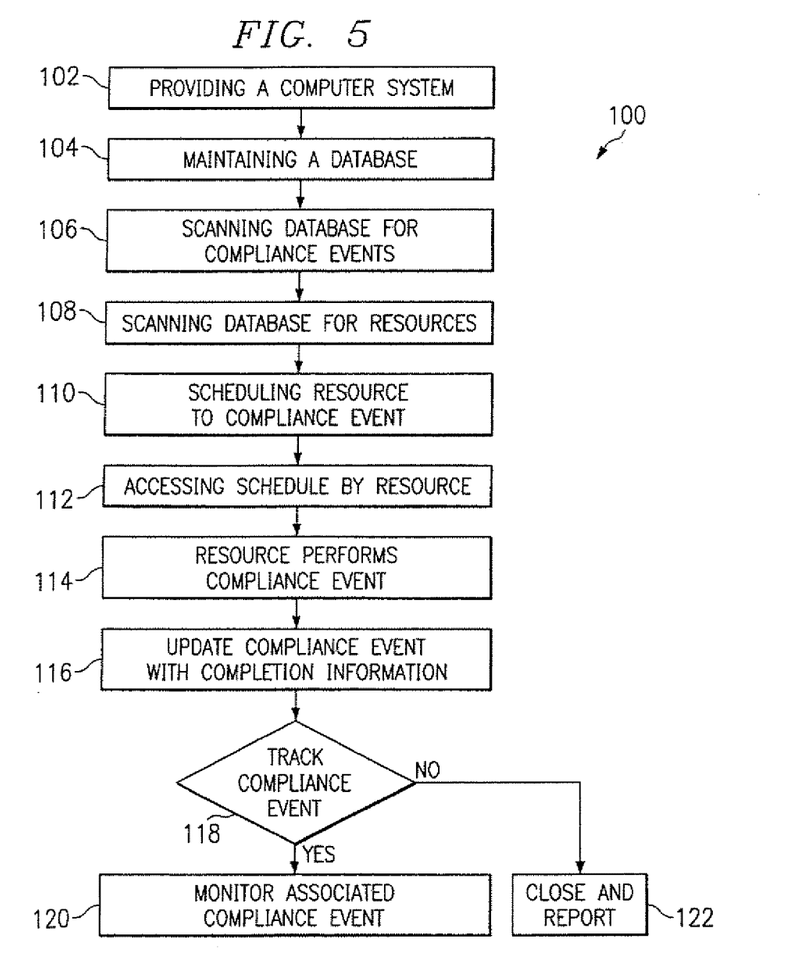
FIG. 5 is a flow chart illustrating a method for compliance management of a natural gas distribution system according to yet another aspect of the present invention.

FIG. 5 illustrates a flow-chart of a method 100 for compliance management. The method includes, at a block 102, providing a computer system, which may include the main computer 12 and one or more remote computers 14 as previously discussed. The method includes, at a block 104, maintaining a database such as the compliance management database 20 that includes the plurality of compliance events 22 and the plurality of resources 24.

At a block 106, the method includes scanning the database on a periodic basis to determine the compliance events to be performed. At a block 108, the method includes scanning the database for resources, such as the resources 24. As previously discussed, at this block the system may include identifying key fields associated with compliance events 22 so that the appropriate resource 24 can be allocated to the compliance event 22 based upon the capabilities of the resource 22 including its geographical location or other factors in relation to the compliance event 22.

At a block 110, the method includes scheduling the resource 24 to perform the compliance event 22. The compliance management system 10 may physically produced a schedule which may be a report or a database including a schedule of the resources 24 and the compliance events 22 or may be a logical schedule produced real-time by dynamically scanning the compliance events 22 and resources 24 of the compliance management database 20. Once the schedule has been prepared, at a block 112, the schedule is accessed by a technician or contractor or other provider associated with the resource 24 that is capable of performing the compliance event 22. Typically, the resource 24 may be a technician or employee of the natural gas distribution operator that is in possession of the remote computer 14 possessing the remote program 28 that is uploaded with the information on a periodic basis representing the schedule of compliance events 22 to be performed by the resource 24. At a block 114, the resource performs the compliance event.

The compliance events 22 may not necessarily always be completed or may be of the type that completion is impractical initially. For example, the compliance event 22 may include several steps that take considerable time to perform, such as construction of a portion the natural gas distribution line. Furthermore, some of the compliance events 22 may not be completed at all where it becomes impractical. The compliance management system 10 of the present invention is capable of maintaining such information within the compliance management database 20 to record for reporting and archival purposes such instances by providing additional fields or databases for such information.

At a block 116, the method provides for updating the compliance event 22 with completion information. As previously discussed, the remote computer 14 communicates with the main computer 12 completion information indicative of fulfilling the compliance event 22, for example by satisfactorily monitoring the riser such as when the compliance event is the cathotic protection 40.

Where such compliance events require additional follow-up or scheduling, at a block 118, the method provides for determining whether to track the compliance event 22. For example, where the compliance event 22 is of the sort that requires a follow-up or more than one step or procedure, the method, at a block 120, provides for monitoring the associated compliance event which may include scheduling subsequent corollary or associated compliance events 22 that would be scheduled to be handled by the resources 24 at a later date.

In the event the compliance event 22 does not require additional tracking or monitoring, at a block 122 the completion information is recorded with the compliance event 22, such as by indicating that a monitor was performed or verification that the anode was working properly on the cathotic protection 40. Thereafter, the record may be maintained in the system for archival and reporting purposes to satisfy the regulatory and administrative practices for which the compliance management system 10 of the present invention is used.

Thus, it is apparent that there has been provided, in accordance with the present invention, a compliance management system and method for managing compliance for a natural gas distribution system that satisfies one or more of the advantages set forth above. Although the preferred embodiment has been described in detail, it should be understood that various changes, substitutions, and alterations may be made herein without departing from the scope of the present invention, even if all of the advantages identified above are not present. For example, the various embodiments shown in the drawings herein illustrate that the present invention may be implemented and embodied in a variety of different ways that still fall within the scope of the present invention.

Also, the techniques, designs, elements, and methods described and illustrated in the preferred embodiment as discrete or separate may be combined or integrated with other techniques, designs, elements, or methods without departing from the scope of the present invention. Other examples of changes, substitutions, and alterations are readily ascertainable by one skilled in the art and could be made without departing from the spirit and scope of the present invention.

The invention claimed is:

1. A computerized method for natural gas distribution service line construction management comprising:
    maintaining a database of a plurality of service line construction events, information about a plurality of resources and one or more regulatory and administrative compliance procedures relevant to operation of natural gas distribution;
    scanning the database to identify one of the plurality of service line construction events that requires a response;
    scanning, using at least one computer processor, the database to identify at least one of the plurality of resources that are used to respond to the identified service line construction event requiring the response;
    matching the at least one identified resource with the identified service line construction event requiring the response wherein the at least one identified resource is in compliance with at least one of the one or more regulatory and administrative compliance procedures; and
    scheduling the at least one identified resource to respond to the identified service line construction event.

2. The method of claim 1, wherein the scheduling further comprises:
    sending a portion of the identified service line construction event and information about the at least one identified resource to a remote computer; and
    updating the database with completion information regarding the identified service line construction event.

3. The method of claim 2, wherein the remote computer is associated with the at least one identified resource.

4. The method of claim 2, wherein the method further comprises generating a report including the identified service line construction event and the completion information.

5. The method of claim 2, wherein the updating the database further comprises updating a follow-up information associated with the identified service line construction event.

6. The method of claim 2, wherein the matching comprises associating a location of the identified service line construction event with a location of the at least one identified resource.

7. The method of claim 2, wherein the matching comprises associating a qualification and capability requirement of the identified service line construction event with a qualification and capability of the at least one resource.

8. The method of claim 2, wherein the matching comprises associating a time by which the identified service line construction event must be completed and an availability of the at least one identified resource.

9. The method of claim 1, wherein the scheduling comprises scheduling a particular date to perform the identified service line construction event.

10. The method of claim 1, wherein the method further includes generating a report including the identified service line construction event and the at least one identified resource.

11. A system for natural gas distribution service line construction management comprising:
    a database including a plurality of service line construction events, a plurality of resources one or more regulatory and administrative compliance procedures relevant to operation of natural gas distribution, and a plurality of units, each of the plurality of service line construction events and the plurality of resources associated with at least one of the plurality of units;
    a scheduling program for scheduling one of the plurality of resources to perform one of the plurality of service line construction events by selecting the resource that is associated with a first respective one of the plurality of units that is similar to a second respective one of the plurality of units that is associated with the service line construction event to be performed; and
    a remote computer for displaying and periodically updating at least a portion of the service line construction event to be performed by the resource.

12. The system of claim 11, wherein each of the plurality of service line construction events have a priority and an associated unit.

13. The system of claim 12, wherein the priority of each of the plurality of service line construction events is associated with a time-frame for responding to each of the plurality of service line construction events.

14. The system of claim 12, wherein the first unit is further defined as one of a plurality of geographical areas associated with each of the plurality of service line construction events and the plurality of resources.

15. The system of claim 11, wherein the remote computer comprises a laptop computer.

16. The system of claim 11, wherein the remote computer comprises a personal digital assistant.

17. The system of claim 11, wherein the remote computer comprises a wireless device.

18. The system of claim 17, wherein the wireless device comprises a wireless telephone.

19. The system of claim 17, wherein the wireless device comprises a pager.

20. An article of manufacture for natural gas distribution service line management, the article of manufacture comprising:
   at least one processor readable storage medium; and
   instruction stored on the at least one medium;
   wherein the instructions are configured to be readable from the at least one medium by at least one processor and thereby cause the at least one processor to operate so as to:
      scan a database to identify one of a plurality of service line construction events requiring a response;
      scan the database to identify one of a plurality of resources to respond to the service line construction event requiring the response;
      match the identified resource with the identified service line construction event wherein the identified resource is in compliance with one or more regulatory and administrative compliance procedures relevant to operation of natural gas distribution; and
      schedule the matched resource to respond to the matched service line construction event.

* * * * *